United States Patent
Maheswari et al.

(10) Patent No.: US 11,270,339 B1
(45) Date of Patent: Mar. 8, 2022

(54) SYSTEM, METHOD, AND COMPUTER PROGRAM FOR USING FULL AND PARTIAL DYNAMIC CUSTOMER CRITERIA SETS FOR TARGETING PROMOTIONS

(71) Applicant: Amdocs Development Limited, Limassol (CY)

(72) Inventors: Yogesh Maheswari, Pune (IN); Dinesh Kumar Mohapatra, Pune (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 120 days.

(21) Appl. No.: 16/547,334

(22) Filed: Aug. 21, 2019

Related U.S. Application Data

(60) Provisional application No. 62/720,777, filed on Aug. 21, 2018.

(51) Int. Cl.
G06Q 30/02 (2012.01)

(52) U.S. Cl.
CPC ..... *G06Q 30/0253* (2013.01); *G06Q 30/0239* (2013.01); *G06Q 30/0257* (2013.01); *G06Q 30/0277* (2013.01)

(58) Field of Classification Search
None
See application file for complete search history.

(56) References Cited

U.S. PATENT DOCUMENTS

| | | | | |
|---|---|---|---|---|
| 6,047,283 A * | 4/2000 | Braun | | G06F 16/322 |
| 6,427,140 B1 * | 7/2002 | Ginter | | G06Q 20/102 |
| | | | | 705/80 |
| 9,081,672 B1 * | 7/2015 | Nemes | | G06F 12/123 |
| 9,148,475 B1 * | 9/2015 | Mealey | | H04L 67/42 |
| 9,230,548 B2 * | 1/2016 | Fastow | | G10L 15/285 |
| 10,931,766 B2 * | 2/2021 | Ton | | G06F 16/24 |
| 10,943,269 B1 * | 3/2021 | Bradley | | G06Q 30/0246 |
| 2002/0107735 A1 * | 8/2002 | Henkin | | G06Q 30/0255 |
| | | | | 705/14.55 |
| 2005/0038699 A1 * | 2/2005 | Lillibridge | | G06Q 30/0275 |
| | | | | 705/14.35 |
| 2007/0083531 A1 * | 4/2007 | Hussain | | H04L 9/0643 |
| 2007/0194957 A1 * | 8/2007 | Watanabe | | G06F 16/334 |
| | | | | 341/106 |

(Continued)

OTHER PUBLICATIONS

Hash Sort: a Linear Time Complexity Mulitiple-Dimensional Sort Algorithm, William F. Gilreath, arXiv:cs/0408040v1 [cs.DS] Aug. 17, 2004.*

(Continued)

*Primary Examiner* — David J Stoltenberg
(74) *Attorney, Agent, or Firm* — Zilka-Kotab, P.C.

(57) ABSTRACT

As described herein, a system, method, and computer program are provided for using full and partial dynamic customer criteria sets for targeting promotions. In use, a promotion criteria set is configured for each of a plurality of promotions associated with salable entities. Additionally, a customer criteria set is dynamically generated for a customer. Further, full and partial matching of the customer criteria set to the promotion criteria sets is performed to determine one or more target promotions from the plurality of promotions. Still yet, the one or more target promotions are output for presentation to the customer.

17 Claims, 9 Drawing Sheets

(56) References Cited

U.S. PATENT DOCUMENTS

| | | | |
|---|---|---|---|
| 2009/0097654 A1* | 4/2009 | Blake | G06F 16/9014 380/277 |
| 2010/0153008 A1* | 6/2010 | Schwartz | G01C 21/20 701/408 |
| 2011/0055010 A1* | 3/2011 | Behroozi | G06F 16/9535 705/14.52 |
| 2011/0206200 A1* | 8/2011 | Sovio | H04L 9/3073 380/30 |
| 2011/0238985 A1* | 9/2011 | Sovio | H04N 21/25816 713/168 |
| 2013/0124281 A1* | 5/2013 | Evans | G06Q 30/0213 705/14.13 |
| 2013/0254033 A1* | 9/2013 | Krishnamoorthy | G06Q 30/0207 705/14.56 |
| 2013/0275756 A1* | 10/2013 | Sovio | H04L 9/3073 713/168 |
| 2013/0298084 A1* | 11/2013 | Spivack | G06Q 50/01 715/854 |
| 2013/0339297 A1* | 12/2013 | Chen | G06F 16/273 707/624 |
| 2014/0025460 A1* | 1/2014 | Knowles | G06Q 30/0215 705/14.23 |
| 2014/0025497 A1* | 1/2014 | Jha | G06Q 30/02 705/14.54 |
| 2014/0156402 A1* | 6/2014 | Jha | G06Q 30/0257 705/14.54 |
| 2014/0180802 A1* | 6/2014 | Boal | G06Q 30/0211 705/14.49 |
| 2014/0278950 A1* | 9/2014 | Lemphers | G06Q 30/0239 705/14.49 |
| 2014/0344066 A9* | 11/2014 | Heiser, II | G06Q 20/10 705/14.66 |
| 2014/0351048 A1* | 11/2014 | Fordyce | G06Q 30/02 705/14.53 |
| 2014/0379428 A1* | 12/2014 | Phansalkar | H04L 67/22 705/7.32 |
| 2015/0010143 A1* | 1/2015 | Yang | H04L 9/3249 380/28 |
| 2015/0101062 A1* | 4/2015 | Silver | G06Q 30/02 726/26 |
| 2015/0169467 A1* | 6/2015 | Chase | G06F 16/9014 711/216 |
| 2015/0220999 A1* | 8/2015 | Thornton | H04M 15/8011 705/14.66 |
| 2016/0100026 A1* | 4/2016 | Musumeci | H04L 67/2842 709/217 |
| 2016/0210664 A1* | 7/2016 | Biswas | G06Q 30/0255 |
| 2016/0323259 A1* | 11/2016 | Carlson | G06Q 20/4014 |
| 2016/0342482 A1* | 11/2016 | Aronovich | G06F 16/2455 |
| 2016/0371732 A1* | 12/2016 | Heiser, II | G06F 16/9535 |
| 2017/0316443 A1* | 11/2017 | Goodhart | G06Q 30/0242 |
| 2017/0316446 A1* | 11/2017 | Goodhart | G06Q 30/0242 |
| 2017/0330230 A1* | 11/2017 | Cosman | G06Q 10/067 |
| 2018/0011851 A1* | 1/2018 | Xiu | G06F 16/2255 |
| 2018/0025081 A1* | 1/2018 | Denninghoff | G06F 40/134 707/711 |
| 2018/0096417 A1* | 4/2018 | Cook | G06F 16/953 |
| 2018/0189839 A1* | 7/2018 | Lutnick | G06Q 50/34 |
| 2018/0330427 A1* | 11/2018 | Hussain | G06Q 20/12 |
| 2019/0146849 A1* | 5/2019 | Leonard | G06F 9/5083 718/104 |
| 2019/0303623 A1* | 10/2019 | Reddy | G06F 11/3692 |

OTHER PUBLICATIONS

A New Approach to Hash Function Construction for Textual Data: A Comparison, Skala et al., 2014 4th World Congress on Information and Communication Technologies (WICT 2014).*

Adaptive Hashing Based Multiple Variable Length Pattern Search Algorithm for Large Data Sets, Kanuga et al., 2014 International Conference on Data Science & Engineering (ICDSE).*

Hashing for Dynamic and Static Internal Tables, Lewis et al., Oct. 1988, IEEE.*

Improved Hash and Index Searching Techniques for Computers Using a Cache And/Or Virtual Memory, Bozman et al., IP.com No. IPCOM000057640D, IP.com Electronic Publication Date: Feb. 15, 2005.*

Cormen et al., "Introduction to Algorithms (3rd ed.)," The MIT Press, 2009, pp. 3-1292.

Knuth, D., "The Art of Computer Programming: vol. 3, Sorting and Searching (2nd ed.)," Addison-Wesley, 1998, 1,061 pages.

Demaine, E., "Advanced Data Structures: Lecture 2," Course from MIT, Feb. 12, 2003, pp. 1-7, retrieved from http://courses.csail.mit.edu/6.897/spring03/scribe_notes/L2/lecture2.pdf.

Bell, S., "Why website speed is critical to online retail success in 2015," CDNetworks, Feb. 19, 2015, 7 pages, retrieved from http://se.cdnetworks.com/cdnetworks/sg/en/news-and-events/Why-website-speed-is-critical-to-online-retail-success-in-2015.

* cited by examiner

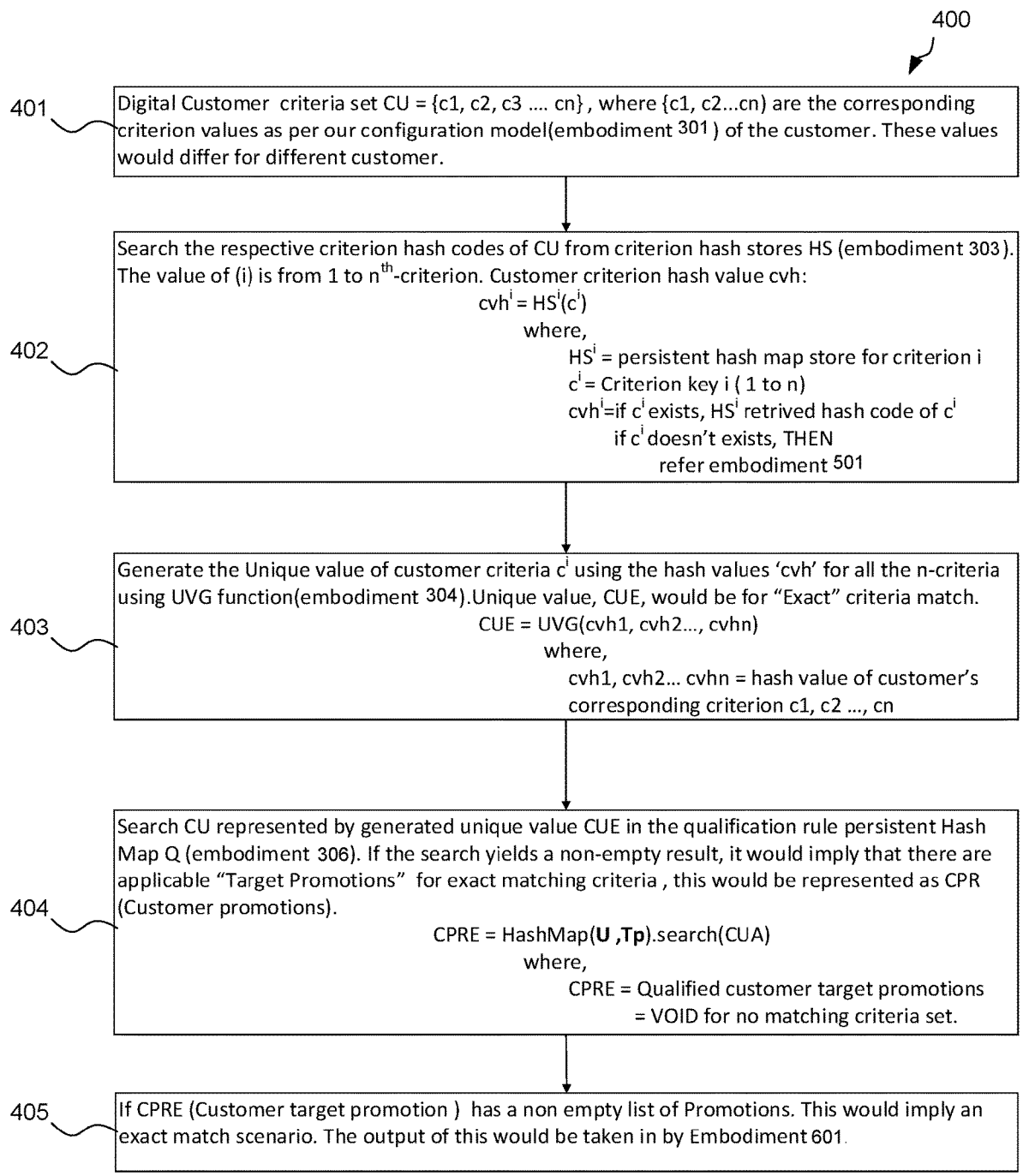

401 Digital Customer criteria set CU = {c1, c2, c3 .... cn}, where {c1, c2...cn) are the corresponding criterion values as per our configuration model(embodiment 301) of the customer. These values would differ for different customer.

402 Search the respective criterion hash codes of CU from criterion hash stores HS (embodiment 303). The value of (i) is from 1 to $n^{th}$-criterion. Customer criterion hash value cvh:

$$cvh^i = HS^i(c^i)$$

where,
$HS^i$ = persistent hash map store for criterion i
$c^i$ = Criterion key i ( 1 to n)
$cvh^i$=if $c^i$ exists, $HS^i$ retrived hash code of $c^i$
if $c^i$ doesn't exists, THEN
refer embodiment 501

403 Generate the Unique value of customer criteria $c^i$ using the hash values 'cvh' for all the n-criteria using UVG function(embodiment 304).Unique value, CUE, would be for "Exact" criteria match.

$$CUE = UVG(cvh1, cvh2..., cvhn)$$

where,
cvh1, cvh2... cvhn = hash value of customer's corresponding criterion c1, c2 ..., cn

404 Search CU represented by generated unique value CUE in the qualification rule persistent Hash Map Q (embodiment 306). If the search yields a non-empty result, it would imply that there are applicable "Target Promotions" for exact matching criteria , this would be represented as CPR (Customer promotions).

$$CPRE = HashMap(U,Tp).search(CUA)$$

where,
CPRE = Qualified customer target promotions
= VOID for no matching criteria set.

405 If CPRE (Customer target promotion ) has a non empty list of Promotions. This would imply an exact match scenario. The output of this would be taken in by Embodiment 601.

FIG. 4

SYSTEM, METHOD, AND COMPUTER PROGRAM FOR USING FULL AND PARTIAL DYNAMIC CUSTOMER CRITERIA SETS FOR TARGETING PROMOTIONS

RELATED APPLICATIONS

The present application claims priority to U.S. Provisional Application No. 62/720,777, filed Aug. 21, 2018 and entitled "SYSTEM, METHOD, AND COMPUTER PROGRAM FOR PROVIDING TARGETED PROMOTIONS FOR MARKETING AND SALES CONVERSION BY ALLOWING DIFFERENTIAL TREATMENT FOR DIFFERENT CUSTOMER SEGMENTS," the entire contents of which is incorporated herein by reference.

FIELD OF THE INVENTION

The present invention relates to targeting promotions to customers.

BACKGROUND

The best products remain unsold without the right promotions. Often, one of the biggest challenges to a Telecommunication Service Provider (TSP) marketer is insightfulness of a right price that would attract a given customer segment, for a product. On top of that, the speed of multiple market and technology factors changes the 'right price' in a short interval of time, sometimes a day. The above is true for most of the product industries; but, for a TSP it gets further complicated where the bulk of business depends on continued customer loyalty when it comes to re-contracting a current subscription. In the midst of multiple competing considerations, a telecommunication marketer needs to be extremely sensitive on retail and digital channels to allow for differential pricing for different target segments—on both new and recontract sales. In retail, a customer sales representative's (CSR) assistance can help to advance a sale—a prerogative that is not available to a digital marketer. A digital marketer can react very efficiently to the ever-changing market dynamics if they can apply different promotions (e.g. fixed, variable, contract based, tiered) seamlessly and real-time.

Today, proactive up-sale strategies are dependent on human intervention because the field of possible up-sale options is too big for users to choose from on their own. Reducing the list proposed for the user to a size which allows him to consider the options on his own, while still proposing the best match offers/promotions for him to select from, is needed to transform the process to fully automated without bothering the customer with a long list of questions before presenting to him the list.

There is thus a need for addressing these and/or other issues associated with the prior art.

SUMMARY

As described herein, a system, method, and computer program are provided for using full and partial dynamic customer criteria sets for targeting promotions. In use, a promotion criteria set is configured for each of a plurality of promotions associated with salable entities. Additionally, a customer criteria set is dynamically generated for a customer. Further, full and partial matching of the customer criteria set to the promotion criteria sets is performed to determine one or more target promotions from the plurality of promotions. Still yet, the one or more target promotions are output for presentation to the customer.

BRIEF DESCRIPTION OF THE DRAWINGS

FIG. 4 illustrates a method of the promotion engine 203 of FIG. 2 to find target promotions based on exact matches between a customer criteria set and the promotions configured in the promotion repository 205 of FIG. 2, in accordance with one embodiment.

DETAILED DESCRIPTION

Figure 1:
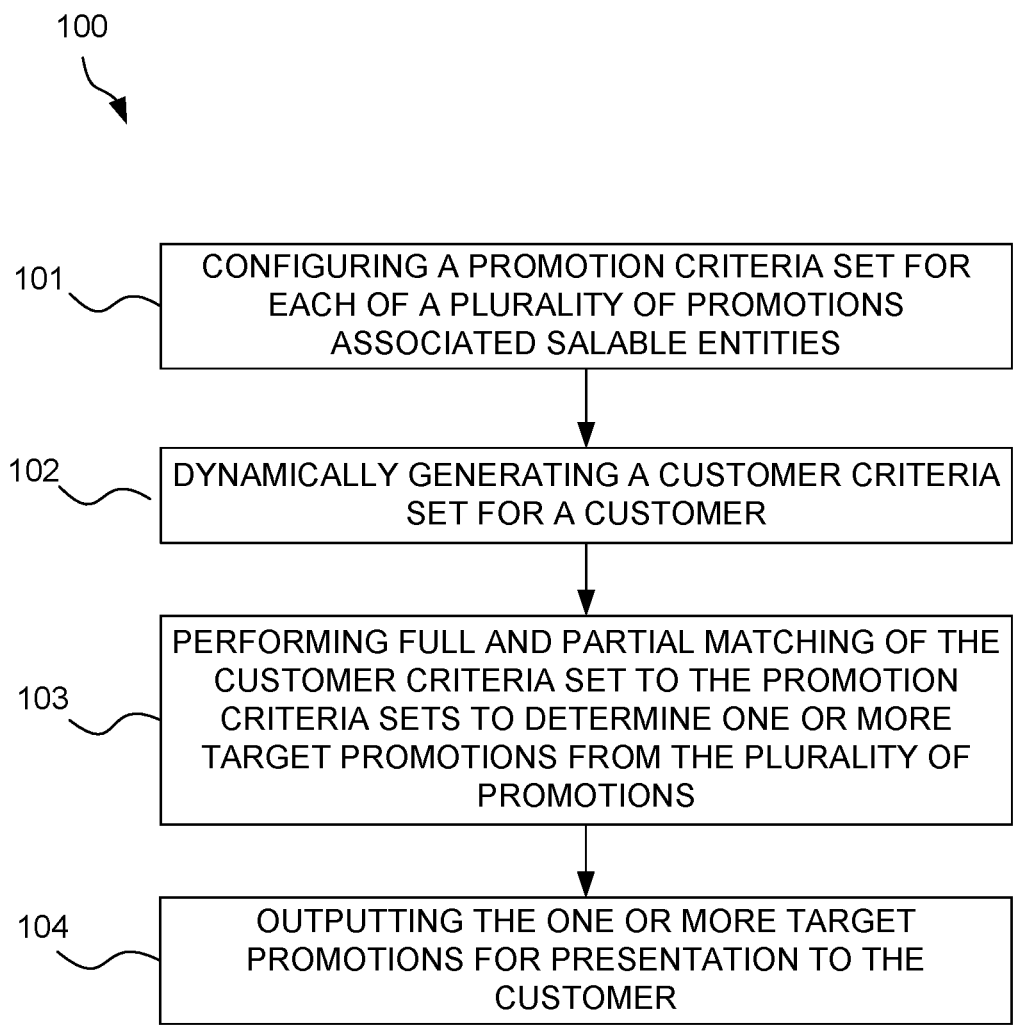
FIG. 1 illustrates a method for using full and partial dynamic customer criteria sets for targeting promotions, in accordance with one embodiment.

FIG. 1 illustrates a method 100 for using full and partial dynamic customer criteria sets for targeting promotions, in accordance with one embodiment. The method 100 may be performed by any computer system, such as system 900 of FIG. 9 described below. Further, the method 100 may be performed by a product and/or service provider (e.g. a TSP) or by a third-party to the product and/or service provider.

As shown in operation 101, a promotion criteria set is configured for each of a plurality of promotions associated with salable entities. In the context of the present description, the salable entities include any products and/or services capable of being offered for sale. For example, the salable entities may be defined in a sales catalog, where the definition includes a unique identifier of the salable entity, a description of the salable entity, a default price of the salable entity, etc.

Also in the context of the present description, the promotions each include a pricing structure and price. The pricing structure may indicate a type of pricing to be used when offering an associated salable entity for sale. For example, the pricing structure may be a fixed price, a variable price, a contract-based price, a tiered price, etc. The price may be a specific cost configured relative to the pricing structure. The promotions may be defined in a promotion repository.

As noted above, the plurality of promotions are associated with the salable entities. Thus, the promotions may each be applicable to an associated salable entity. This association may be provided by mapping each of the salable entities to one or more of the promotions, or vice versa. For example, the associations may be provided in a reference table.

The promotion criteria set that is configured for each of the promotions may be a set of one or more criteria to which the promotion is applicable. The criteria may relate to possible aspects of a customer (e.g. demographics, current subscription status, etc.), possible aspects of a relevant customer transaction (e.g. channel from which the transaction was received, date of the transaction, etc.), or any other desired criteria.

The promotion criteria set may be configured as an n-dimensional (or n-m multi-dimensional) array, vector, or other multi-element data structure. Each element in the promotion criteria set may indicate or otherwise identify a particular criterion to which the promotion is applicable (when taken alone or in combination with one or more other criteria in the promotion criteria set).

The promotion criteria set configured for each of the promotions may be stored, in one embodiment. As explained in more detail with respect to the subsequent Figures below, each of the promotion criteria sets may be stored in a persistent hash data structure such that fetching one or more of the plurality of promotions for a target customer criteria set has a time complexity of O(1). Further, each promotion criteria set may be associated with one of the promotions by mapping each promotion criteria set to one of the promotions. For example, the associations may be provided in a reference table which may the same or different from the reference table used to associate the promotions and salable entities.

Additionally, in operation 102, a customer criteria set is dynamically generated for a customer. The customer may be a user, subscriber of a particular service (e.g. offered by the aforementioned service provider), etc. The customer criteria set that is dynamically generated for the customer may be a set of one or more criteria applicable to the customer. For example, the criteria may include aspects of the customer (e.g. demographics, current subscription status, etc.), aspects of a relevant customer transaction (e.g. channel from which the transaction was received, date of the transaction, etc.), etc. Thus, the customer criteria set may define a profile for the customer.

Similar to the promotion criteria set, the customer criteria set may be configured as an n-dimensional (or n-m multi-dimensional) array, vector, or other multi-element data structure. Each element in the customer criteria set may indicate or otherwise identify a particular criterion to relevant to the customer. Further, the customer criteria set may be stored in association with an identifier of the customer.

In one embodiment, the customer criteria set may be generated dynamically by being generated responsive to a trigger. The trigger may be the customer requesting a particular transaction (e.g. purchase of a particular product or service), the customer requesting a particular web page, etc. In any case, the customer criteria set may be dynamic with respect to a particular (e.g. current) point in time, and thus may reflect various aspects of the customer at that particular point in time. It should be noted that the customer criteria set may be generated using information gathered from various sources, such as a customer repository (e.g. of the service provider) storing information for customers, a transaction system that received the request for the particular transaction, etc.

Further, in operation 103, full and partial matching of the customer criteria set to the promotion criteria sets is performed to determine one or more target promotions from the plurality of promotions. In one embodiment, the full matching includes determining one or more of the promotion criteria sets having all criteria matched to criteria in the customer criteria set. In another embodiment, the partial matching includes determining one or more of the promotion criteria sets having one or more criteria matched to criteria in the customer criteria set.

The results of the full and partial matching may indicate the fully matched and partially matched promotion criteria sets, respectively. The promotions associated with the fully matched and partially matched promotion criteria sets may then be determined to be target promotions for the customer.

In operation 104, the one or more target promotions are output for presentation to the customer. As noted above, the promotions are associated with certain salable entities, and so the target promotions may be output in connection with the associated salable entities.

In one embodiment, the target promotion(s) may be output to the product and/or service provider which may in turn present the target promotion(s) to the customer. For example, the target promotion(s) may be presented a webpage displayed to the user. Optionally, the target promotion(s) may be processed prior to being output to the customer. For example, the target promotion(s) may be ranked and then only a preconfigured number of top ranked target promotion(s) may be output to the user.

To this end, promotions may be targeted to the customer based varying degrees of relevance (full or partial) of the promotions to a dynamically generated profile of the customer. As an option, the full and partial matching of operation 103 may be performed (in that order) under a time constraint, such that the method 100 may output the target promotion(s) to the customer within a specified amount of time. This may restrict the amount of partial matching performed by the method 100, but may ensure a particular timeliness between a trigger (e.g. as in operation 102 or other trigger initiating operation 103) and the output of the target promotion(s) to the customer.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

The embodiments described below are provided in the context of a TSP, and, in particular a TSP eSales platform. Of course, it should be noted that the embodiments may equally be applied to any other product and/or service provider.

Definitions

"Criteria set" is a set of criteria. Criteria and n-criterion in criteria may be used interchangeably. Furthermore, multi-dimensional criteria and n-dimensional criteria may mean the same thing, and denote the number of criteria that a TSP can define as per its business volition. A criterion key can be the value of criterion itself or its hash value or hash code. A hash code—also called digests or hashes—represent a unique value for a data. A hash code is generated through a perfect hash function. The search on a hash map (or hash table) thus would have the property of search time complexity of O(1). A time complexity of O (1) results in the most efficient search as the search time doesn't grow regardless of the size of data. Hence, the mechanism to unleash this property to have optimum performance is one important embodiment provided herein.

"Universal criterion" is a value of the criterion in the criteria set to represent a universal value. Universal criterion would be referred as "*" to denote all the set of values a criterion can represent.

"Salable entities" are products or services a TSP would like to sell to its customers. Salable entities and salable offers are used interchangeably.

"Promotion" or "Promotion entity" is a discount that could range from, though not limited to, waiving charges, a percentage discount, a few months complete or partial waiver, etc.

"Target Promotion" refers to a salable entity associated with one or more promotions.

"Partial Criteria" refers to any customer criteria set have zero or n−1 criterion element matching the actual customer criterion. The rest of the complementary one to n criterion in the criteria are marked as universal criterion ("*") of the exaction criterion.

"Exact Match" refers to a one-to-one match of the customer criteria set with the promotion criteria set.

"Partial Match" refers to one to one match of a generated customer "partial criteria" to the promotion criteria set.

The details of the following embodiments are explained in the context of TSP business dimensions and underscore the relative importance of each of the elements in a marketing and sales process. The effectives sales of a TSP depends on the interplay of technological, service, and commerce dimensions, each of which plays a different role in maintaining a TSP's relationship (or loyalty) with its customer base.

Figure 2:
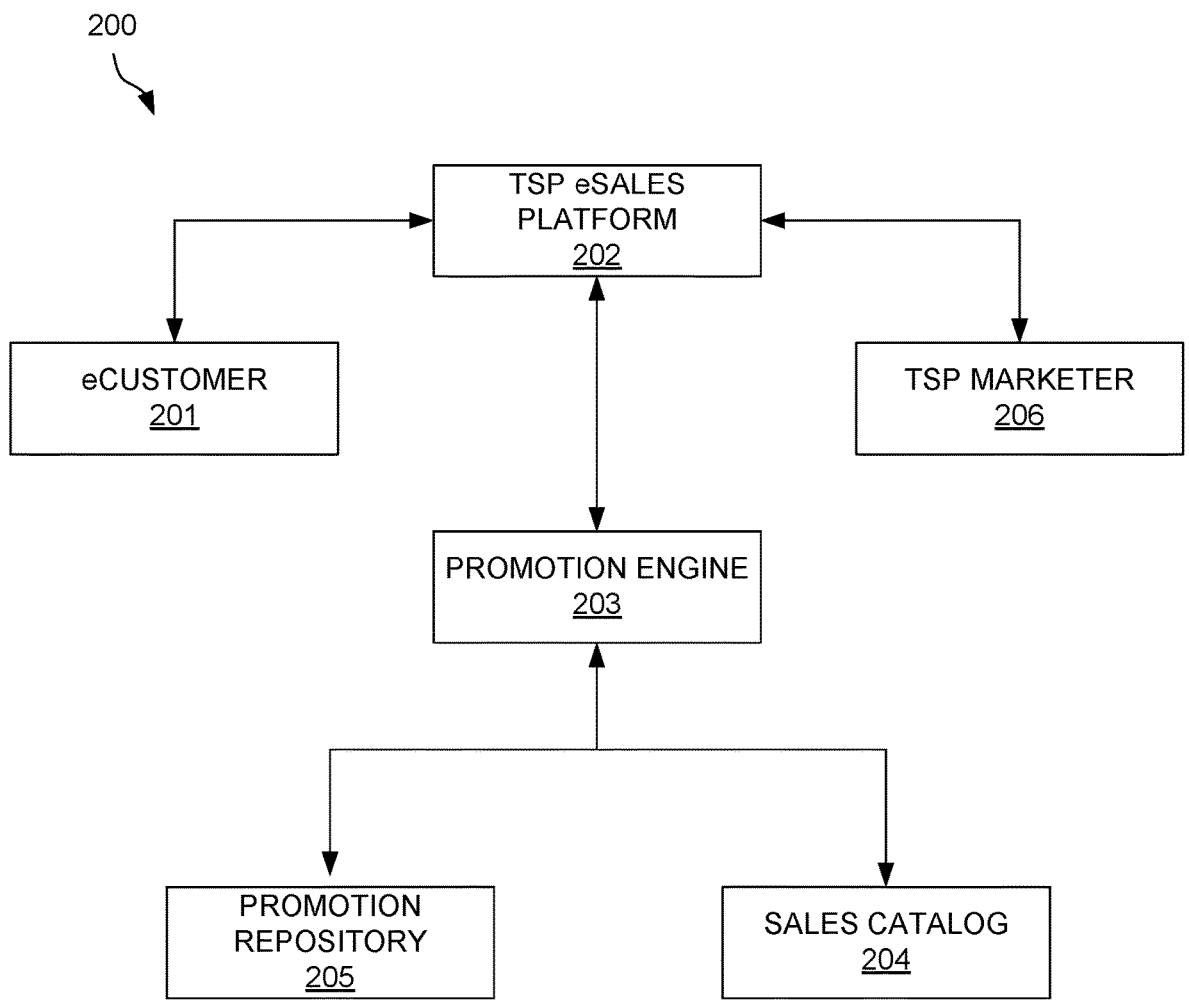
FIG. 2 illustrates a system flow diagram for using full and partial dynamic customer criteria sets for targeting promotions, in accordance with one embodiment.

FIG. 2 illustrates a system flow diagram 200 for using full and partial dynamic customer criteria sets for targeting promotions, in accordance with one embodiment. As an option, the flow diagram 200 may be implemented in the context of the details of the previous figure and/or any subsequent figure(s). Of course, however, the flow diagram may be implemented in the context of any desired environment. Further, the aforementioned definitions may equally apply to the description below.

As shown, an eCustomer 201 is in communication with a TSP eSales platform 102. The eCustomer is an actual online customer of the TSP (e.g. via an end user computing device). A customer criteria set is dynamically generated for the eCustomer 101.

The TSP eSales platform 202 is a system that supports a sales interaction with the eCustomer 201. For example, the TSP eSales platform 202 may include one or more interfaces (e.g. webpages, etc.) through which the eCustomer 201 can initiate or complete a purchase or other transaction.

A promotion engine 203 interfaces the TSP eSales platform 202 to determine target promotions for the TSP eSales platform 202 to provide to the eCustomer 201. The promotion engine 203 may perform the method 100 of FIG. 1. For example, the promotion engine 203 may dynamically generate a customer criteria set for the eCustomer 201 (e.g. based on information obtained from the TSP eSales platform 202).

The promotion engine 203 may further perform full and partial matches of the customer criteria set to promotion criteria sets configured for promotions that are stored in a promotion repository 205. The promotions and/or promotion criteria sets may be configured by a TSP marketer 106. Further, the promotions may be associated with salable entities in a sales catalog 204. In this way, the promotion engine 203 may determine target promotions for the eCustomer 201 which include promotions for certain salable entities, and may provide those target promotions to the TSP eSales platform 202 for being output to the eCustomer 201.

The sales catalog 204 exemplifies the technological dimension of a TSP which may be contingent on an evolving wireless mobile specification. The evolution and implementation is continuous, right from the days of 0G ('mobile cellular radio'). With each successive generation 1G, 2G . . . 4G of wireless mobile specification, the service and product offering has progressively become more complex. The complexity will only continue to evolve further with 5G and beyond. There are many obvious and not-obvious changes for the customer with such specifications. One of the obvious changes is the change of fixed phone devices to mobile device, where the mobile devices in turn change from basic models to high end smartphones. The technological dimension would derive salable items for a TSP, which would each be embodied as an offer vector. The various offerings that a TSP would provide to its customer include:

$O=\{O1, O2, O3 \ldots On\}$ where, O=Salable entities or Salable Offers.

Embodiments of O would consist of one salable entity of either of Mobile, Broadband, TV, Home products etc., or their combinations. O1 can be Mobile Plan with no roaming, while O2 can be Mobile plan with unlimited roaming. The different embodiments, in any case, form the core of TSP's sales catalog along with its features and prices. All these salable items would be part of the Sales Catalog 204. The Salable items may be charged, free or discounted.

Figure 3:
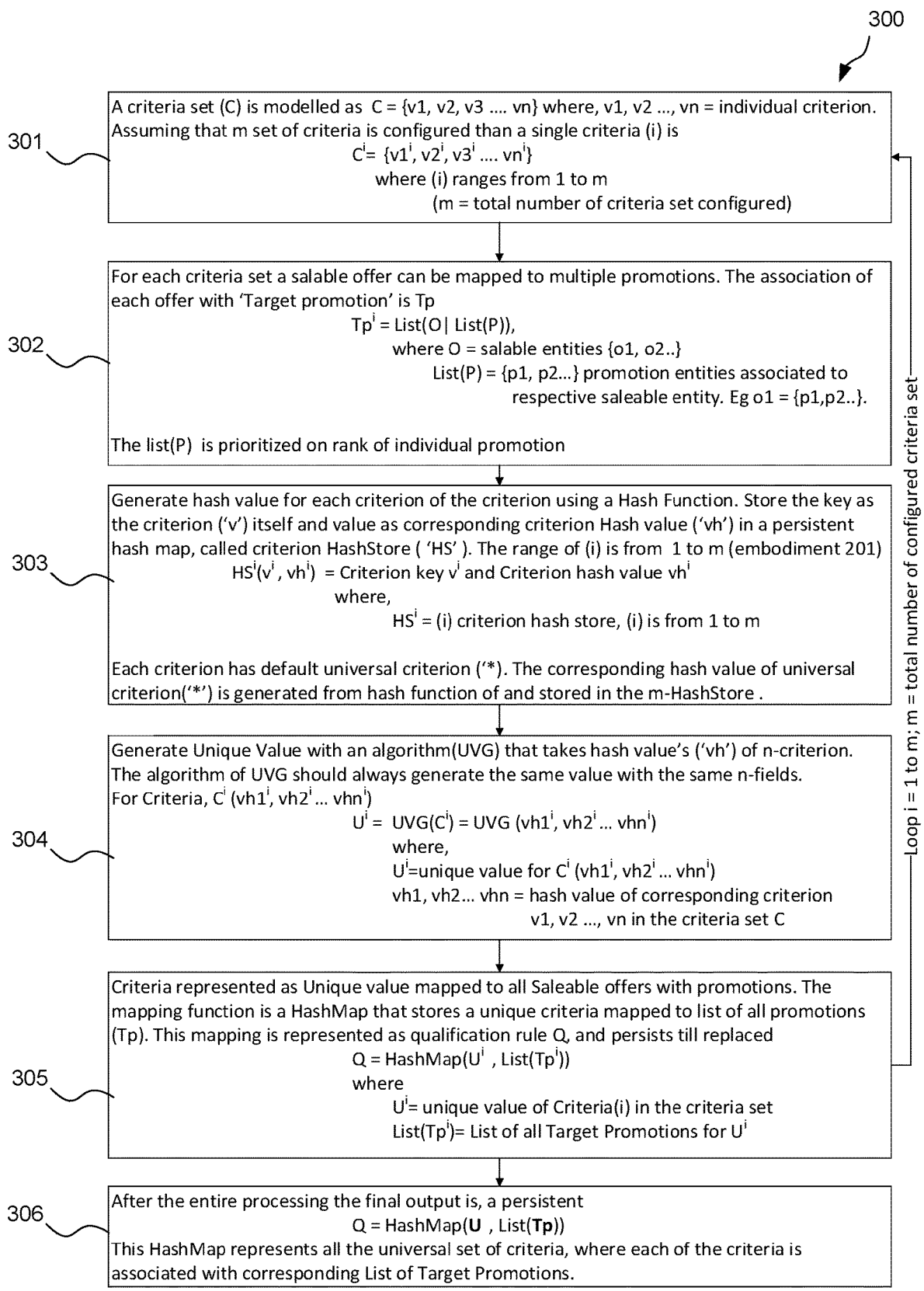
FIG. 3 illustrates a method of the promotion engine 203 of FIG. 2 to configure promotion criteria sets for each of a plurality of promotions associated with salable entities, in accordance with one embodiment.

FIG. 3 illustrates a method 300 of the promotion engine 203 of FIG. 2 to configure promotion criteria sets for each of a plurality of promotions associated with salable entities, in accordance with one embodiment. In one embodiment, the method 300 may be performed during bootup of the promotion engine 203 to create a persistent storage of the promotion criteria sets.

The service dimension of a TSP is related to the differential treatment of customers based on different criteria (n-vector). This criteria is configured as a promotion criteria set. A criterion—discrete or a continuous—would refer to one measurement on a customer, for example 'customer type' can be a criterion with different values such as public, staff, corporate, government, etc. Each TSP would like to have customized offering based 'customer type'. Likewise, there can be other criteria, including but not limited to, the following shown in Table 1.

TABLE 1

| n-Criteria | Illustrative Values |
|---|---|
| Customer Type (CT) | Staff |
| | Public |
| | Corporate |
| | Government |
| Customer sub type (ST) | Citizen |
| | Foreigner |
| Customer Credit Type (CC) | Excellent |
| | Good |
| | Poor |
| | Defaulter |
| | Unknown |
| Transaction Type (TR) | New |
| | Recontract |
| | Port-in |
| | Change Ownership |
| Contract Period (CP) | 3, 6, 9 months |
| | 1, 2 years |
| | No contract |

TABLE 1-continued

| n-Criteria | Illustrative Values |
| --- | --- |
| Offer Id (OF) | Mobile Combo1 . . . n<br>Fiber<br>TV<br>Combo |
| Brand (BR) | Device brand (e.g. router brand or handphone brand) |
| Model (MO) | Device Model (variant of the Brand) |
| Value Added Service (VS) | Roaming pack<br>Data pack |

Operation 301 defines the multi-dimensional criteria. For different TSPs, this embodiment can differ in the choice of criterion and the number of criterion. However, in any case the criteria can have any number of criterion with multitude of value for each criterion. The value could be both discrete or continuous. Promotion criteria set (C) is defined as C={v1, v2, v3 . . . vn} where, C is criteria set v1, v2 . . . , vn=individual criterion For notational simplicity "*" is an embodiment of a universal criterion value (a catch-all condition) for a criterion value—including an undermined value. A TSP marketer uses "*" as a value embodiment of a criterion, this results the criterion to be value agnostic. Individual promotion criteria sets can have different combinations of values for the individual elements, such as customer subtype (ST). Some exemplary embodiments of promotion criteria sets are:

C1={Public, Citizen, Good, New, 6 months, Mobile Combo2, XYZ Inc, ABC, Roaming}

C2={Public, Citizen, Good, New, 6 months, Mobile Combo2, *, ABC, Roaming}

C3={Public, Citizen, Good, New, 6 months, Mobile Combo2, *, ABC, *}

In the criteria set {C1, C2, C3}; C1 has deterministic values for individual criterion, whereas C2 has brand value criterion "*" (universal set) which would mean that this criterion is brand agnostic. So, C1 is a subset of C2 (C1 ⊂ C2). Likewise, in criteria set C3, it has "*" for brand and VAS, hence it turns out that C1 ⊂ C2 ⊂ C3.

Operation 302 exemplifies the mapping of a promotion criteria set and a "target" promotion. A target promotion refers to a promotion entity associated with a salable entity. A promotion entity refers to a single promotion offered against the salable entity. To have attractive price-point (promotions) a list of promotions could be foreseen to attract the actual sales realization of a salable entity. This embodiment allows for a flexible marketing capability that allows a promotion criteria set association with salable offers; the salable offers in turn are associated with a list of promotions. The list of promotions is created in order of ranking of promotions. Ranking provides a mechanism for the TSP marketer to decide the total number of promotions on a saleable entity.

Operation 303 provides a process framework that generates unique Hash Values through a perfect hash function using any computer programming language (Java, C++ etc.). Each criterion is assigned a hash value (or hash code) through a perfect hash function. A Hash Map is persisted that stores the key and value for each of the n-dimensional criteria. Doing so ensures a fast search as the criteria set can soon have millions of combinations. A hash code generated from a perfect hash function would intrinsically have the search time complexity of O (1), meaning regardless of the size the search has a fixed computable time. Added to this is a Hash value would always be unique for a key, as it would be a one to one association. The hash map for individual criterion is created with a criteria key as that of the value of the criterion and the value as the hash value of the criterion. In a hash map, there is no duplication; so, if while storing the criterion as a key, it would be checked against the hash map of the criterion, if the key doesn't exist the hash map is updated with the key and value. If the hash map has a key as a criterion, then the hash map is not disturbed. It is important to note that the total number of hash maps equals to the total number of foreseen criterion. A 'n' criterion (in a criteria) would imply 'n' hash maps. Each of the 'n'-hash maps have a default value of universal criterion '*', along with value as the generated hash code of the individual universal criterion '*' from a hash function. Doing so would form the basis for partial criteria generation that is explained in operation 501 of FIG. 5 below.

Operation 304 exemplifies the generation of a unique value using the hash code of all the criterion in the criteria. In a multi-dimensional criterion, the embodiment tries to provide the mechanics of generating a unique value through a generator function. The algorithm of generating a unique value must generate the same unique value for any number of criteria that has the same hash codes for corresponding criterion. This unique value represents or can represent ever-growing dimensions of the criterion. So, by induction a n-criterion can be enhanced to a (n+1)-criterion; however, what would remain consistent is the representation of a multi-dimensional criteria being represented by a unique value. This mechanism generates a lot of dynamism in the software program, namely it makes the whole program very scalable amid an ever-changing business landscape.

Operation 305 describes the generation of a qualification rule (Qi), that refers to a Hash Map of the currently processed Criteria and its corresponding "Target" Promotion. The entire criteria, more specifically all the multi-dimensional criterion, is converted into a set of equivalent hash codes, gets a Unique value generated from operation 303. The "Target" Promotion in turn is a list of salable entities that can be associated to a list of promotions for each salable entity. This capability to associate a single salable entity to a list of different promotions allows for a very high flexibility to help in sales conversion. The capability is further explained in operation 602 of FIG. 6 which allows a TSP to have a different policy at its volition.

Operation 301-305 is run over the entire list of promotion criteria sets. The total number of promotion criteria sets, or the total number of criteria in the list, is exemplified in FIG. 3 with variable 'm'. After all the individual elements of the list of criteria is processed, the output is a persistent hash map as exemplified in embodiment 306. This is the final output having all the promotion criteria sets and the associated "Target" Promotions which is cached and persisted throughout the lifecycle of the promotion engine (item 203 of FIG. 2). The TSP marketer's (item 206 of FIG. 2) defined Technological dimension targeted for specific Service dimension (item 205 of FIG. 2) thus is mapped into a hash map data structure that would pave way for quick search when the promotion engine services would be invoked to check "Target" Promotion for a digital customer.

FIG. 4 illustrates a method 400 of the promotion engine 203 of FIG. 2 to find target promotions based on exact matches between a customer criteria set and the promotions configured in the promotion repository 205 of FIG. 2, in accordance with one embodiment. The method 400 depicts an exemplary process that can be used in a promotion engine 203 program to search for the exact customer criteria set in the configured promotion criteria sets. The output of the search is the list of "Target Promotions", which is fetched and then advanced to operation 601 of FIG. 6, for further processing.

The eCommerce business for a TSP, while sharing the tenets of usual commerce business, is markedly different from eCommerce in two ways. The first one is, in a TSP, a sold subscription can undergo multiple other orders. A mobile subscription would be identified with a unique MSISDN number. After a customer purchases a mobile subscription, the customer may change the constituent element of the subscription any time after the first purchase. The changes include, though not limited to, a change in subscriber identity module (SIM) card, MSISDN, add value-added service (VAS) like music, call alert, roaming VAS, etc. The second aspect of the difference is, a TSP sells a contract that can be renewed after a fixed duration. The predictable topline of a TSP is from its customers holding fixed contracts.

The promotion engine (item 203 of FIG. 2) similarly needs to cater to promoting specific use cases. In case of the mobile subscription, the TSP may wish to promote roaming plans during a holiday season, or promote a data plan that may change the usage pattern.

During the contract renewal, it's a customer choice whether they would like to continue with their current TSP. A customer would most like go for the most competitive price, hence it is of a genuine concern for a TSP to ensure the customer renews his contract. A contract renewal not only ensures a stable topline but also increases the loyalty quotient. A renewed contract also is of huge benefit as the usage pattern of a customer is predictable given by any good Machine Learning Engine. In sum, the benefits of reduced churn are always a top priority item. An engine that favors a 'TSP' marketer to allow for right promotions during recontract of different segments (created through a promotion criteria set—service dimension) becomes imperative.

The commerce dimension also makes it a must for a TSP to have very high responsive behavior on online channels during purchase. While a lot of stress is given to the user journey and the user experience, online sales conversion is heavily dependent on the website speed. Faster website speed has shown much better customer retention and sales behavior. Any solution that helps to enable a business process would not show the desired result if the same solution is not efficient in faster processing and enabling a near real time performance. Without a near time performance, the promotion engine wouldn't be able to unleash its desired business outcome. So, amid compelling considerations the invention aims to provide a required algorithm that would have the most optimal search time complexity. A search time complexity of O (1) is possibly the best to search a customer criteria set—defined by n-dimension vector of criterion—in a input space having customer criteria mapped to target promotions.

Operation 401 implicitly highlights that a digital customer can have many variations, and hence may switch segments easily. A simple case could be a portal user that comes without login, and hence is anonymous as opposed a logged in customer (i.e. an identified customer). There is a differential treatment of the customer depending on the details of the customer from an eSales platform. Furthermore, customers can have a myriad of values against any measurable parameter (criterion). The credit rating for example can have different set of values that would be decided by a credit rating company, something which makes the credit rating values itself very dynamic. Similarly, customer parameters would keep changing dynamically. One of the problems any TSP faces is the increasing complexity of customer behavior that is not sufficiently underpinned by measurable criteria, so new criteria gets introduced either through a different learning algorithm or through behavioral scientists. Another equally important aspect with dynamism is the understanding of individual criterion on overall sales, which often is not predictable. This strongly makes the case for the definition of partial criteria. A "partial criteria" by design consists of the value of actual criterion for zero to n−1 attributes, and of universal criteria value ("*") for one to n attributes in a n-dimensional customer criteria set.

Operation 402 exemplifies the process of matching individual criterion of the customer criteria set against the persistent criterion hash map as was processed in operation 302. There are two possibilities, one where the hash map has a stored key, the other where the key is absent. If the criterion is present, the stored hash value of the criterion as was created in operation 302 is retrieved; otherwise, if the any of the criterion in the criteria is missing in the corresponding criterion hash map, then its tried for a partial criteria generation as exemplified in operation 501. When all the criterion exists in the corresponding criterion hash map, the values of criteria elements—for the customer—is equivalently represented with hash values of the criterion. The values of hash codes for criterion is O (1) as it is retrieved from persistent hash map.

Operation 403 exemplifies the process where the hash values of customer criterion is passed to the generator function as was explained in operation 303. It was further ascertained that the unique values generated by the generator function would remain consistent to its objective whereby the same unique value would be generated if the hash values of elements in the criteria set matches. This is an important aspect of the present description, which allows for representing a criteria set with any number of criterion, having fixed or variable values for each criterion, to be assigned a unique value.

Operation 404 performs a lookup of the customer criteria set in the list of configured promotion criteria sets by a TSP marketer. The Persistent hash map (Q) generated as in 306 as a part of the promotion engine boot-up process, is used to do the lookup. The lookup of the unique value generated for a given customer criteria set, from operation 403, is used as the key to search for corresponding value in the persistent hash map. This lookup happens, importantly, in a time complexity of O (1). If the lookup yields a non-empty result, it would imply an exact match scenario. An exact match scenario occurs when the configured promotion criteria set defined by the TSP matches to that of the customer criteria set in exact terms.

Operation 405 refers to the "Target Promotion" for an exact match of the customer criteria set with TSP marketer configured promotion criteria set after the lookup performed in operation 404. This output is advanced to operation 601 as an Exact Matched "target promotion", for further processing.

Figure 5:
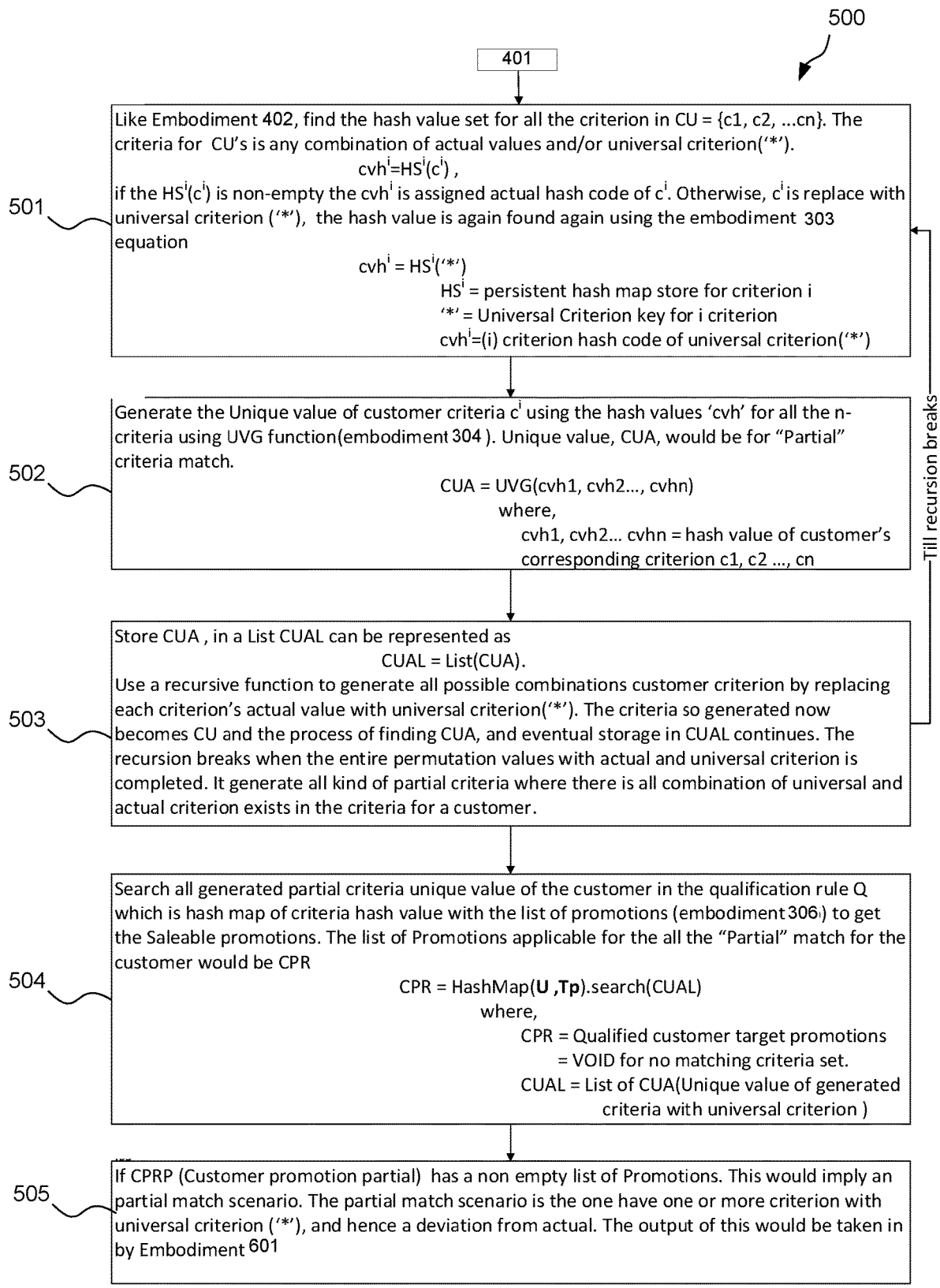
FIG. 5 illustrates a method of the promotion engine 203 of FIG. 2 to find target promotions based on partial matches between a customer criteria set and the promotions configured in the promotion repository 205 of FIG. 2, in accordance with one embodiment.

FIG. 5 illustrates a method 500 of the promotion engine 203 of FIG. 2 to find target promotions based on partial matches between a customer criteria set and the promotions configured in the promotion repository 205 of FIG. 2, in accordance with one embodiment. The method 500 depicts an exemplary process that can be used in a Promotion Engine 203 Program to create Partial Online customer criteria, and then to check these partial Online Customer criteria in the configured promotion criteria sets. The output of the search from all the partial criteria for the customer, in the configuration repository, is the combined list of "Target Promotions" of each of the partial criteria. All these combined outputs of "Target Promotion" advanced to operation 601, for further processing.

Operation 501 has two entry points. One entry point is embodiment 401, where any of the customer criterion in the criteria is not found in the corresponding persistent criterion hash map. The other entry point is embodiment 503, where partial criteria is created and sent for processing. Operation 501 checks the values of all the criterion in the corresponding criterion hash map. It works exactly as per embodiment 402; however, unlike 402 it can handle the scenario where a criterion is not found in the criterion hash map, by replacing the criterion value with universal criterion ("*") and then searching again on the respective criterion hash map. As each of the criterion hash map has a default key as universal criterion ("*") and value as the corresponding hash code (operation 303) the hash code for all the criterion in the criteria set representing the customer would always have values.

Operation 502 reuses embodiment 403 in the context of a partial criteria set hash code. The embodiment is shown more in the context of the partial match scenario for completeness sake.

Operation 503 exemplifies the generation of partial criteria and the subsequent storage of the partial criteria unique value for further processing. The partial criteria set is generated from actual criterion vectors by replacing each criterion with universal criterion ("*"), if the criterion value is not a universal criterion ("*"). A recursive function or equivalent function is used to find all unique permutations of the actual criteria where each of the criterion is in turn replaced with universal criterion ("*"). The recursion stops when each criterion is traversed to represent its actual value and universal criterion ("*"), in the generation of partial criteria. Any of the generated criteria set from this exercise yields some partial criteria that has zero to all criterion as universal criterion ("*"), while the rest of the complementary criterion retain their actual values. The partial criteria go as input to embodiment 501. Operations 501 to 503 is repeated until the recursive function continues to create new partial criteria. The generated unique value for each of the partial criteria is stored in a list called CUAL in the present example, that represents all the possible unique permutations possible to generate partial criteria from actual customer criteria.

Embodiment 504 performs a lookup of the all the partial criteria (CUAL) generated after the completion of partial criteria generation and lookup (operation 501 to 503). The lookup process of the generated partial criteria is done in the Persistent hash map (Q) from operation 306. The lookup of the unique value generated for an instance of a partial customer criteria, from operation 502, is used as the key to search for a corresponding value in the persistent hash map. This lookup, like embodiment 403, is with a time complexity of O (1). If the lookup of the generated value is affirmative, it would imply a partial match scenario of "targeted promotion". The "targeted promotion" for the partial criteria is retrieved from the Persistent hash map (Q) generated as in 306, and stored in a list of "Targeted promotions".

Operation 505 refers to the "Target Promotion" for partial match of customer criteria set with TSP marketer configured criteria after the lookup performed in embodiment 504. This output is advanced to embodiment 601 as Partial Matched "target promotion", for further processing.

Figure 6:
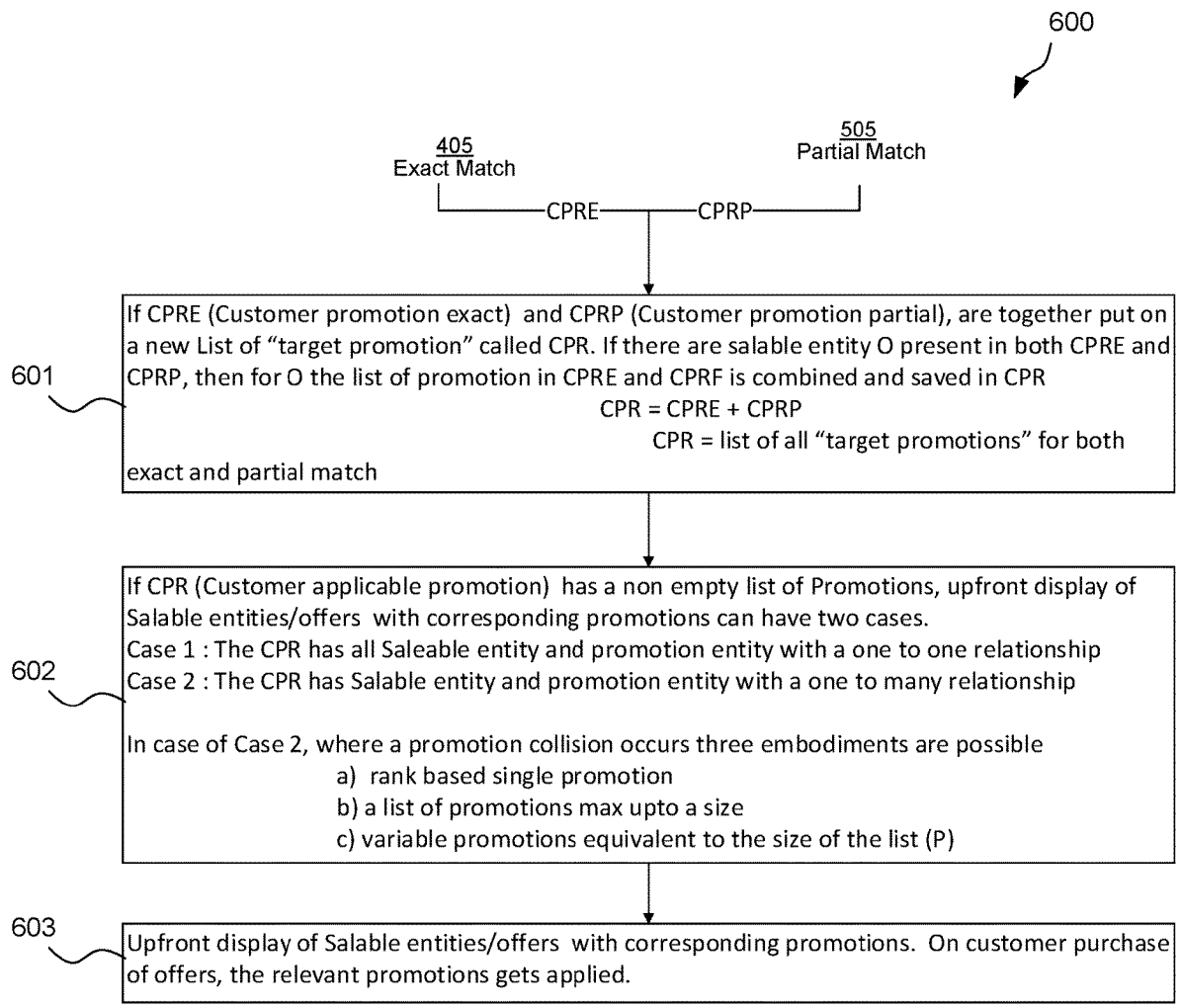
FIG. 6 illustrates a method of the promotion engine 203 of FIG. 2 to present to a customer the target matches resulting from the methods of FIGS. 4 and 5, in accordance with one embodiment.

FIG. 6 illustrates a method 600 of the promotion engine 203 of FIG. 2 to present to a customer the target matches resulting from the methods of FIGS. 4 and 5, in accordance with one embodiment. The method 600 depicts an exemplary process that can be used in a Promotion Engine 203 Program to process the "Target Promotions" from both exact and partial criteria match coherently. The processing of target promotions is carried out further to ascertain the promotions applied to each salable entity. The output of this processing is then used for display to the eCustomer 201 as a targeted marketing effort to convert them into potential sales.

Operation 601 receives input as "targeted promotions" from operations 405 (for exact match) and 505 (for partial match). The target promotions from each of the exact match and partial match criteria set is processed such that for each salable entity all the different promotions are combined such that there is no duplicate promotion entity. As the promotions are ranked, the output of embodiment 601 is a list of salable entities associated to the list of promotion entities for each of the salable entities.

Operation 602 exemplifies the process whereby a target promotion is decided based on the number of promotions on each salable entity. Due to an exact match and partial match combination, there may be multiple cases in which each of the salable entities would be associated with multiple promotions. If one salable entity has one promotion it is intuitive; but, when one salable entity has multiple promotions this is where multiple embodiments are possible based on a TSP business. There can be three variations in this case:

a) Only one promotion entity for one salable entity. If this was a TSP policy, then the rank criteria can be used to decide that one promotion which a salable entity would have.

b) A list of promotions up to a fixed size—called max size. If this was a TSP policy, then on any breach of promotion after the max size, the lower ranked promotion after the max size are ignored.

c) Variable promotions are possible. In this case all the promotions are applied and rank is ignored.

Any variation or a combination of variation can be used by the TSP based on policy or line of business. The "target promotion" so generated after policy alignment is fed to operation 603.

Operation 603 exemplifies the use of "target promotion" that can be used for upfront display to the eCustomer 201. The different salable entities along with associated promotion is targeted based on business wisdom and market conditions, which has a higher foreseen ability of conversion. On conversion, the selected promotions get applied.

Figure 7:
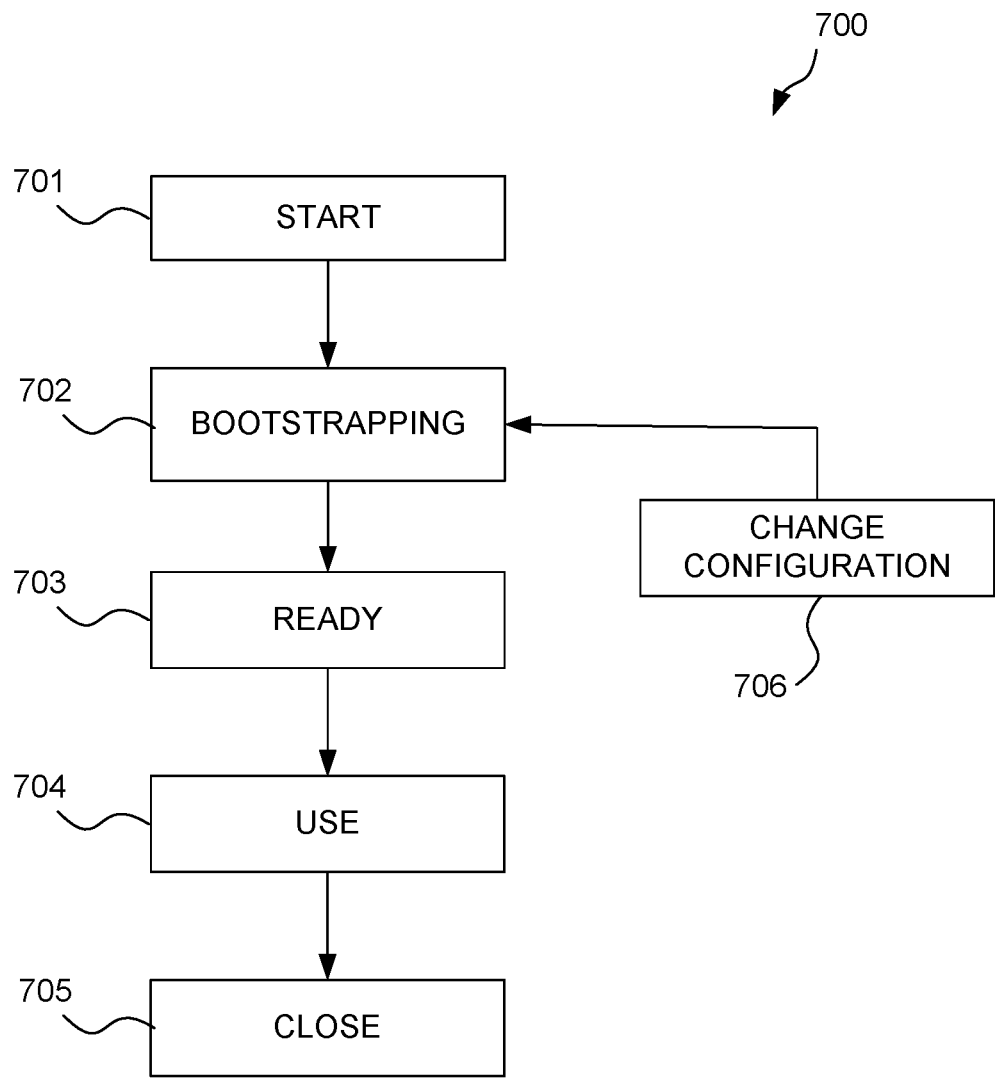
FIG. 7 illustrates a method of the lifecycle for the promotion engine 203 of FIG. 2, in accordance with one embodiment.

FIG. 7 illustrates a method of the lifecycle for the promotion engine 203 of FIG. 2, in accordance with one embodiment. The promotion engine 203 works seamlessly to serve the TSP.

Operation 701 refers to the starting of the promotion engine server. It would mean the program is loaded in memory.

Operation 702 exemplifies the bootstrap or the bootup process. This would include accessing and processing the Promotion Repository (item 205 of FIG. 2). As a part of processing, the method 300 of FIG. 3 would be triggered. All the different persistent hash maps or Hash stores get initialized. It should be noted that operation 306 would represent the entire Promotion Repository entries post any necessary validation processes. This would form the basis on which an online customer interaction can have the foreseen "targeted promotions".

Operation 703 exemplifies that the promotion engine 203 has completed all the bootstrapping activities and is ready to serve the TSP eSales platform 202.

Operation 704 exemplifies that the promotion engine 203 is used by the eCustomer 201 of the TSP through the eSales platform 202. Here the eCustomer 201 would be processed for the methods described in detail with respect to FIGS. 4-6. Here the customer criteria set would be accessed for targeted promotion in a time complexity of O (1).

Operation 705 exemplifies ongoing changes when the system is in use by a TSP marketer. Doing so would trigger the bootstrap of operation 702 again. Once the system is in Ready state (operation 703), the system would switch from existing configuration to the changed configuration. It happens in near real time from an end-customer perspective and is typically triggered by a marketer after close of business hours to have no consequential customer impact. However, this embodiment can be performed anytime and with business processes foreseen by the TSP both to react to market dynamics.

Operation 706 exemplifies the stopping of the Promotion Engine 203 for critical system or software upgrades.

Figure 8:
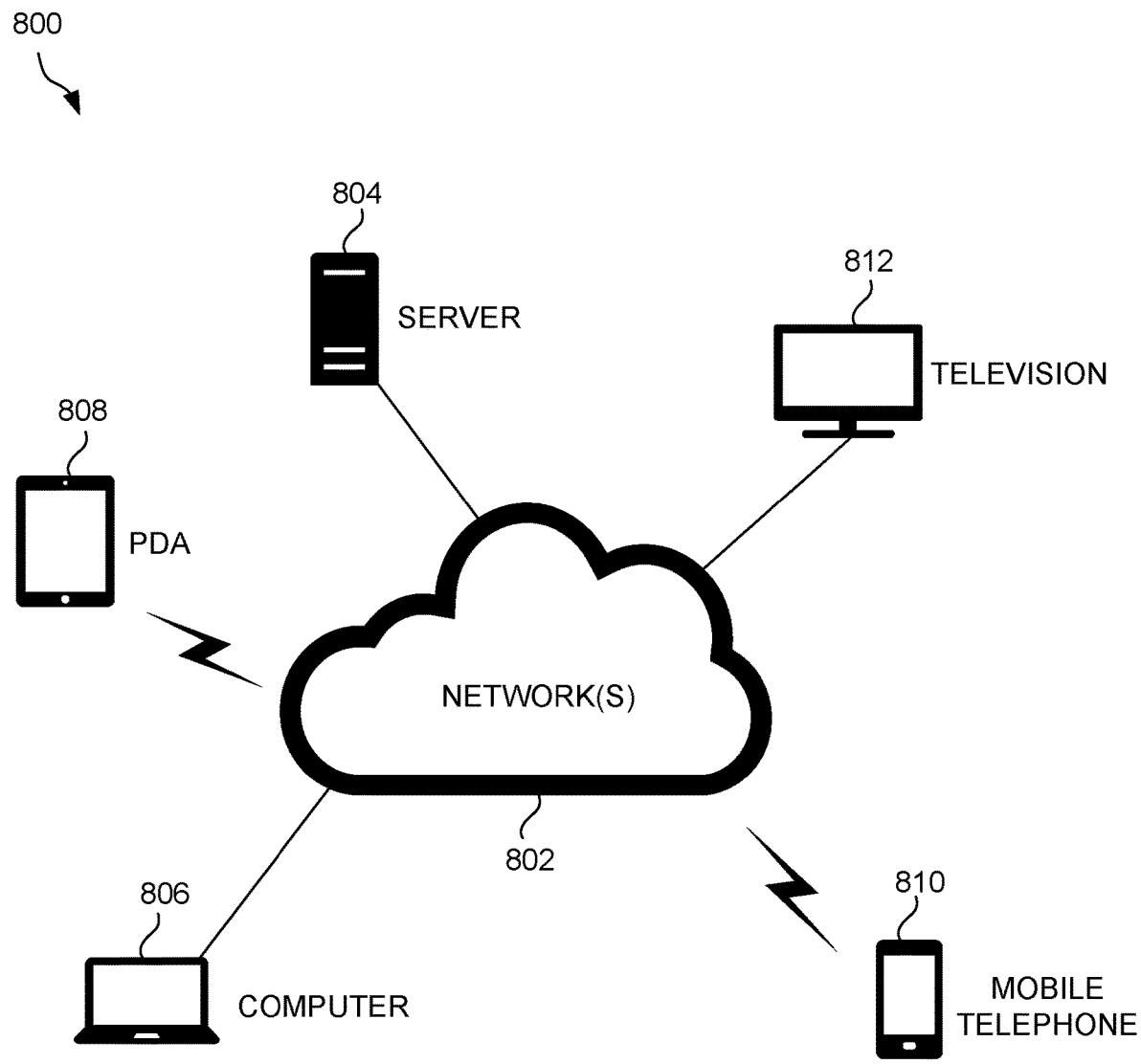
FIG. 8 illustrates a network architecture, in accordance with one possible embodiment.

FIG. 8 illustrates a network architecture 800, in accordance with one possible embodiment. As shown, at least one network 802 is provided. In the context of the present network architecture 800, the network 802 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 802 may be provided.

Coupled to the network 802 is a plurality of devices. For example, a server computer 804 and an end user computer 806 may be coupled to the network 802 for communication purposes. Such end user computer 806 may include a desktop computer, lap-top computer, and/or any other type of logic. Still yet, various other devices may be coupled to the network 802 including a personal digital assistant (PDA) device 808, a mobile phone device 810, a television 812, etc.

Figure 9:
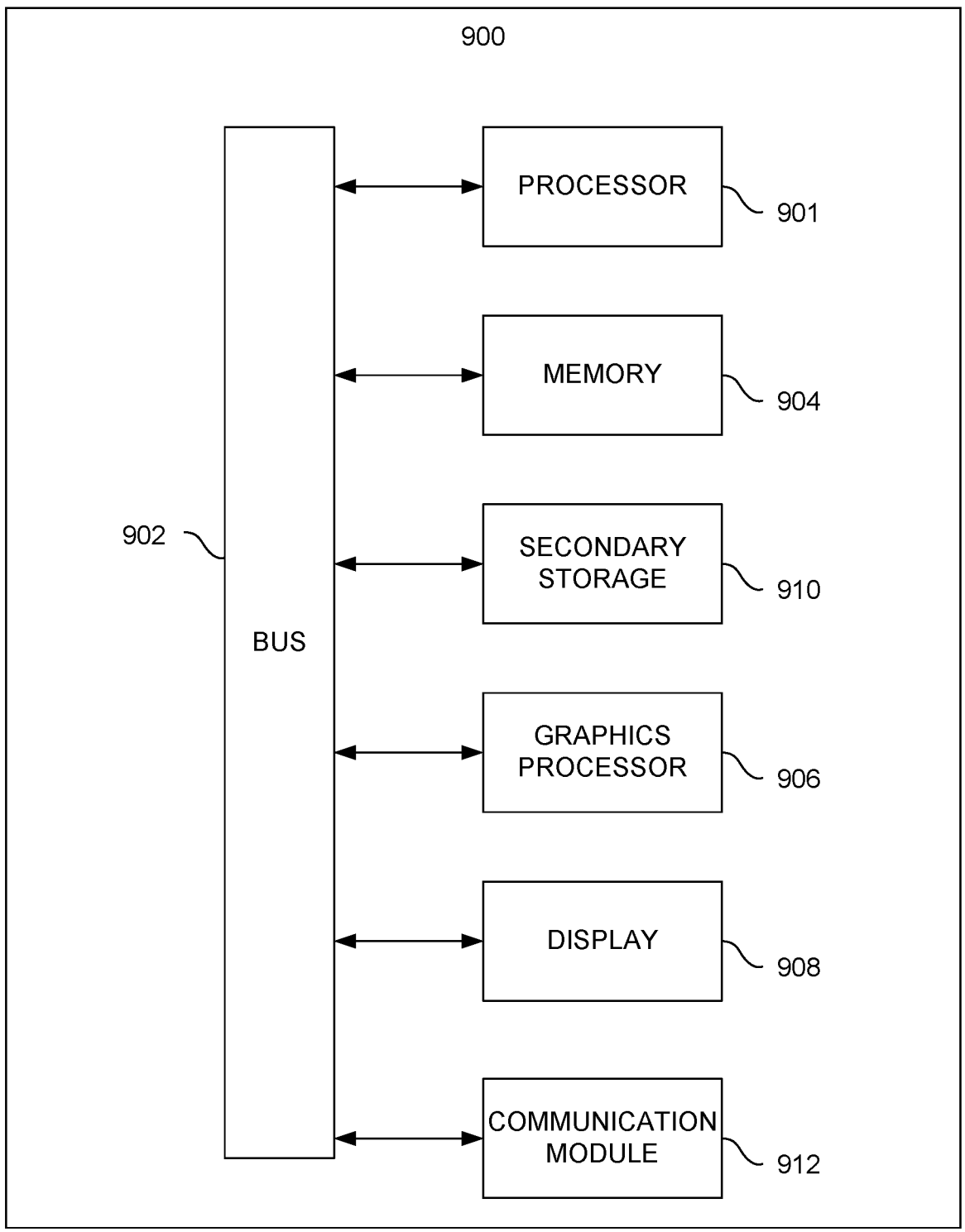
FIG. 9 illustrates an exemplary system, in accordance with one embodiment.

FIG. 9 illustrates an exemplary system 900, in accordance with one embodiment. As an option, the system 900 may be implemented in the context of any of the devices of the network architecture 800 of FIG. 8. Of course, the system 900 may be implemented in any desired environment.

As shown, a system 900 is provided including at least one central processor 901 which is connected to a communication bus 902. The system 900 also includes main memory 904 [e.g. random access memory (RAM), etc.]. The system 900 also includes a graphics processor 906 and a display 908.

The system 900 may also include a secondary storage 910. The secondary storage 910 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 904, the secondary storage 910, and/or any other memory, for that matter. Such computer programs, when executed, enable the system 900 to perform various functions (as set forth above, for example). Memory 904, storage 910 and/or any other storage are possible examples of non-transitory computer-readable media.

The system 900 may also include one or more communication modules 912. The communication module 912 may be operable to facilitate communication between the system 900 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
    configuring a promotion criteria set for each of a plurality of promotions associated with salable entities, the promotion criteria set including a plurality of different promotion criterions;
    storing the promotion criteria sets in a persistent hash data structure, wherein a search for one or more of the plurality of promotions for a target customer criteria using the persistent hash data structure has a fixed computable time regardless of a size of the search, and wherein storing the promotion criteria sets in the persistent hash data structure includes, for each of the promotion criteria sets:
        assigning a hash value to each criterion of the plurality of different promotion criterions, and
        storing, in the persistent hash data structure, the hash values assigned to the plurality of different promotion criterions;
    dynamically generating a customer criteria set for a customer, the customer criteria set including a plurality of customer criterions;
    performing full and partial matching of the customer criteria set to the promotion criteria sets stored in the persistent hash data structure to determine one or more target promotions from the plurality of promotions,
    wherein the full matching includes determining one or more of the promotion criteria sets having all promotion criterions of the plurality of different promotion criterions matched to the plurality of customer criterions in the customer criteria set, and
    wherein the partial matching includes determining one or more of the promotion criteria sets having any one criterion of the plurality of different promotion criterions matched to any one criterion of the plurality of customer criterions in the customer criteria set; and
    outputting the one or more target promotions for presentation to the customer.

2. The non-transitory computer readable medium of claim 1, wherein the salable entities include at least one of products or services capable of being offered for sale.

3. The non-transitory computer readable medium of claim 2, wherein the salable entities are defined in a sales catalog.

4. The non-transitory computer readable medium of claim 1, wherein the promotions each include a pricing structure and price, the pricing structure including a fixed price, a variable price, a contract-based price, or a tiered price.

5. The non-transitory computer readable medium of claim 1, wherein the promotions are associated with the salable entities by providing a mapping between the promotions and the salable entities.

6. The non-transitory computer readable medium of claim 1, wherein the promotion criteria set is configured as an n-dimensional vector, with each element in the n-dimensional vector indicating a particular criterion of the plurality of different promotion criterions.

7. The non-transitory computer readable medium of claim 1, wherein the plurality of customer criterions of the customer criteria set is applicable to the customer.

8. The non-transitory computer readable medium of claim 7, wherein the plurality of customer criterions include aspects of the customer and aspects of a relevant customer transaction.

9. The non-transitory computer readable medium of claim 7, wherein the customer criteria set is configured as an n-dimensional vector, with each element in the n-dimensional vector indicating a particular criterion of the plurality of customer criterions.

10. The non-transitory computer readable medium of claim 1, wherein the customer criteria set is generated dynamically by being generated responsive to a trigger.

11. The non-transitory computer readable medium of claim 10, wherein the trigger includes the customer requesting a particular transaction or webpage.

12. The non-transitory computer readable medium of claim 1, wherein results of the full and partial matching indicate fully matched promotion criteria sets and partially matched promotion criteria sets, respectively, and wherein promotions associated with the fully matched promotion criteria sets and partially matched promotion criteria sets are determined to be the one or more target promotions for the customer.

13. The non-transitory computer readable medium of claim 1, wherein the one or more target promotions are processed prior to being output for presentation to the customer, the processing including ranking the one or more target promotions.

14. The non-transitory computer readable medium of claim 1, wherein performing the full and partial matching of the customer criteria set to the promotion criteria sets to determine the one or more target promotions from the plurality of promotions includes generating a hash map for each of the promotion criteria sets and performing the full and partial matching using the hash map generated for each of the promotion criteria sets.

15. A method, comprising:
at a computer system:
configuring a promotion criteria set for each of a plurality of promotions associated with salable entities, the promotion criteria set including a plurality of different promotion criterions;
storing the promotion criteria sets in a persistent hash data structure, wherein a search for one or more of the plurality of promotions for a target customer criteria using the persistent hash data structure has a fixed computable time regardless of a size of the search, and wherein storing the promotion criteria sets in the persistent hash data structure includes, for each of the promotion criteria sets:
  assigning a hash value to each criterion of the plurality of different promotion criterions, and
  storing, in the persistent hash data structure, the hash values assigned to the plurality of different promotion criterions;
dynamically generating a customer criteria set for a customer, the customer criteria set including a plurality of customer criterions;
performing full and partial matching of the customer criteria set to the promotion criteria sets stored in the persistent hash data structure to determine one or more target promotions from the plurality of promotions,
wherein the full matching includes determining one or more of the promotion criteria sets having all promotion criterions of the plurality of different promotion criterions matched to the plurality of customer criterions in the customer criteria set, and
wherein the partial matching includes determining one or more of the promotion criteria sets having any one criterion of the plurality of different promotion criterions matched to any one criterion of the plurality of customer criterions in the customer criteria set; and
outputting the one or more target promotions for presentation to the customer.

16. A system, comprising:
a non-transitory memory storing instructions; and
one or more processors in communication with the non-transitory memory that execute the instructions to perform a method comprising:
configuring a promotion criteria set for each of a plurality of promotions associated with salable entities, the promotion criteria set including a plurality of different promotion criterions;
storing the promotion criteria sets in a persistent hash data structure, wherein a search for one or more of the plurality of promotions for a target customer criteria using the persistent hash data structure has a fixed computable time regardless of a size of the search, and wherein storing the promotion criteria sets in the persistent hash data structure includes, for each of the promotion criteria sets:
  assigning a hash value to each criterion of the plurality of different promotion criterions, and
  storing, in the persistent hash data structure, the hash values assigned to the plurality of different promotion criterions;
dynamically generating a customer criteria set for a customer, the customer criteria set including a plurality of customer criterions;
performing full and partial matching of the customer criteria set to the promotion criteria sets stored in the persistent hash data structure to determine one or more target promotions from the plurality of promotions,
wherein the full matching includes determining one or more of the promotion criteria sets having all promotion criterions of the plurality of different promotion criterions matched to the plurality of customer criterions in the customer criteria set, and
wherein the partial matching includes determining one or more of the promotion criteria sets having any one criterion of the plurality of different promotion criterions matched to any one criterion of the plurality of customer criterions in the customer criteria set; and
outputting the one or more target promotions for presentation to the customer.

17. The non-transitory computer readable medium of claim 1, wherein each hash value is stored with a corresponding key in a hash map.

* * * * *